US012663970B2

(12) United States Patent
Kinsner et al.

(10) Patent No.: US 12,663,970 B2
(45) Date of Patent: Jun. 23, 2026

(54) DATA PARALLEL PROGRAMMING TASK GRAPH OPTIMIZATION THROUGH DEVICE TELEMETRY

(71) Applicant: Intel Corporation, Santa Clara, CA (US)

(72) Inventors: Michael Kinsner, Halifax (CA); Ben J. Ashbaugh, Folsom, CA (US); James Brodman, Marlborough, MA (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/692,425

(22) Filed: Mar. 11, 2022

(65) Prior Publication Data

US 2022/0197615 A1     Jun. 23, 2022

(51) Int. Cl.
*G06F 8/41*          (2018.01)
*G06F 9/48*          (2006.01)

(52) U.S. Cl.
CPC ............ *G06F 8/4441* (2013.01); *G06F 8/433* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2004/0088705 A1* | 5/2004 | Eslick | ..................... | G06F 8/447 |
| | | | | 718/102 |
| 2010/0169861 A1* | 7/2010 | Wang | ........................ | G06F 8/41 |
| | | | | 717/110 |
| 2012/0324196 A1* | 12/2012 | Maillet | ................. | G06F 9/5016 |
| | | | | 711/170 |
| 2015/0268992 A1* | 9/2015 | Fan | ........................ | G06F 9/4881 |
| | | | | 718/106 |
| 2017/0075734 A1* | 3/2017 | Raman | ................... | G06F 9/4881 |
| 2020/0264892 A1* | 8/2020 | Drego | ................... | G06F 9/5061 |
| 2021/0173720 A1* | 6/2021 | Cormack | .............. | G06F 9/5094 |
| 2021/0303338 A1* | 9/2021 | Lai | ........................... | G06F 9/546 |
| 2021/0373892 A1* | 12/2021 | Tovey | ................... | G06F 9/5038 |
| 2021/0373957 A1* | 12/2021 | Tovey | ..................... | G06F 9/522 |
| 2023/0106369 A1* | 4/2023 | Flynn | ..................... | G06N 20/00 |
| | | | | 718/103 |

* cited by examiner

*Primary Examiner* — Qing Chen
(74) *Attorney, Agent, or Firm* — Jaffery Watson; HAMILTON & DESANCTIS LLP

(57) ABSTRACT

An apparatus to facilitate data parallel programming task graph optimization through device telemetry is disclosed. The apparatus includes a processor to: receive, from a compiler, compiled code generated from source code of an application, the compiled code to support a workload of the application; generate a task graph of the application using the compiled code, the task graph to represent at least one of a relationship or dependency of the compiled code; receive runtime telemetry data corresponding to execution of the compiled code on the one or more accelerator devices; identify one or more scheduling optimizations for the one or more accelerator devices based on the task graph and the received telemetry data; and provide a scheduling command to cause the one or more scheduling optimizations to be implemented in the one or more accelerator devices.

19 Claims, 7 Drawing Sheets

500

Start offline telemetry harvesting of an application

510

Extract device telemetry data corresponding to kernel invocations of the application on one or more accelerator devices

520

Sufficient data collected?

530

No

Run additional sequence of kernels/ data copies

540

Yes

Model training successful and ready for broad deployment

550

<u>600</u>

DATA PARALLEL PROGRAMMING TASK GRAPH OPTIMIZATION THROUGH DEVICE TELEMETRY

FIELD

This disclosure relates generally to data processing and more particularly to data parallel programming task graph optimization through device telemetry.

BACKGROUND OF THE DISCLOSURE

The use of hardware accelerators (e.g., graphics processing units (GPU), programmable logic devices, etc.) for edge computing has enabled faster workload processing and has emerged as an effective architecture for acceleration of Artificial Intelligence (AI) and Machine Learning (ML) use cases at the edge. Meanwhile, the growing popularity of AI and ML is increasing the demand for virtual machines (VMs).

A programmable logic device (or programmable integrated circuit (IC)) (e.g., field programmable gate array (FPGA)) is one type of hardware accelerator that can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party such as a cloud service provider.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope.

DETAILED DESCRIPTION

Figure 1:
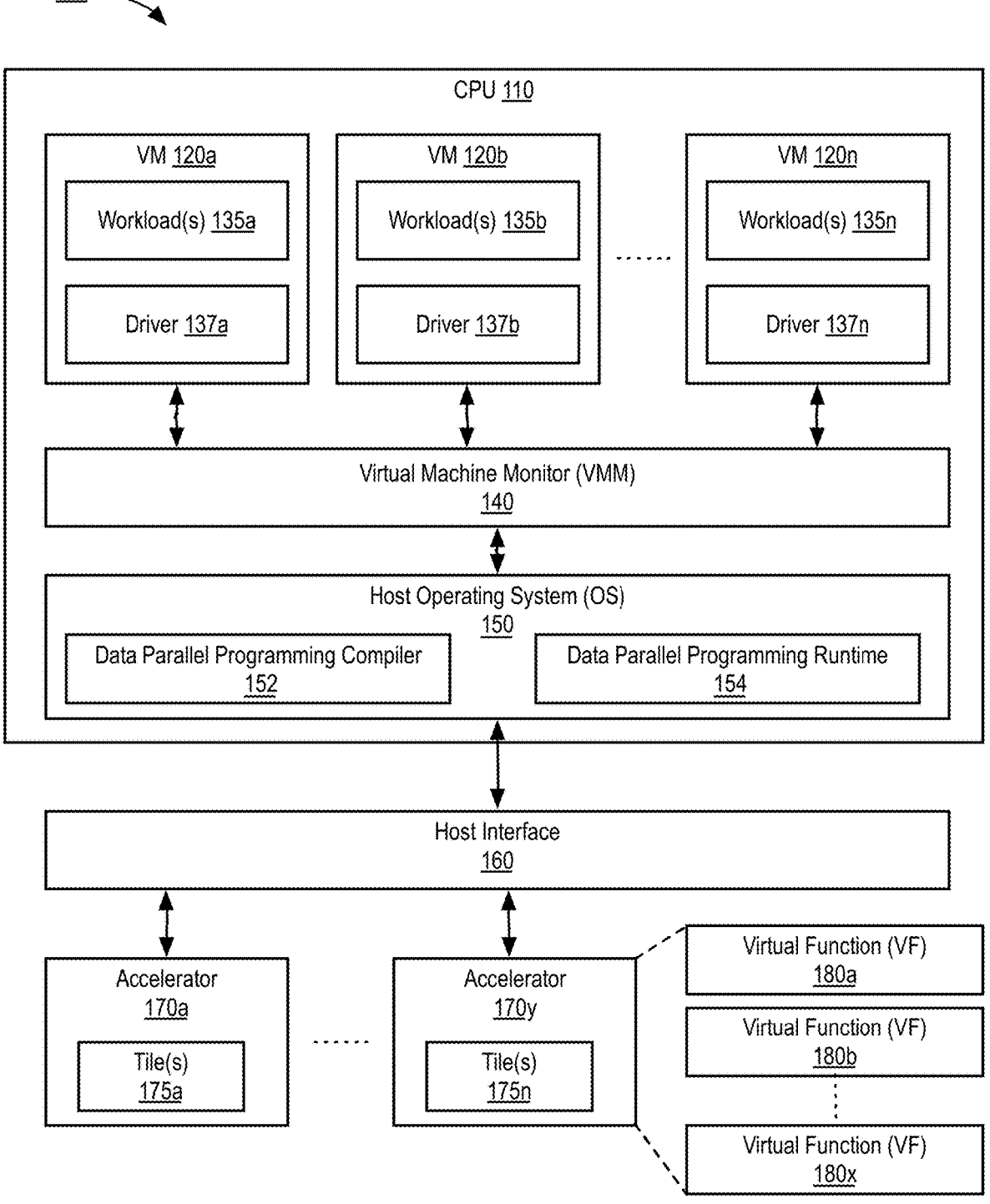
FIG. 1 is a block diagram illustrating a host system for data parallel programming task graph optimization through device telemetry, according to some embodiments.

Implementations of the disclosure are directed to data parallel programming task graph optimization through device telemetry. The use of hardware accelerators (e.g., specialized central processing units (CPUs), general-purpose CPUs, graphics processing units (GPU), programmable logic devices, etc.) has enabled, among other use cases, faster workload processing and has emerged as an effective architecture for acceleration of Artificial Intelligence (AI) and Machine Learning (ML) use cases. Obtaining high computer performance on hardware accelerators relies on use of code that is optimized, power-efficient, and scalable. The demand for high performance computing continues to increase due to demands in AI, ML, video analytics, data analytics, as well as in traditional high-performance computing (HPC).

Workload diversity in current applications has resulting in a corresponding demand for architectural diversity. No single architecture is optimal for every workload. A mix of scalar, vector, matrix, and spatial (SVMS) architectures deployed in CPU, GPU, AI, and field programmable gate array (FPGA) accelerators, to name a few examples, can be used to provide the performance for the diverse workloads.

Furthermore, coding for CPUs and accelerators relies on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as data parallel C++ (DPC++) programming language. The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that accelerates the workload. A host is available to simplify development and debugging of device code.

With respect to the hardware that accelerates the workload, a variety of accelerators may be utilized herein. A hardware accelerator device (also referred to herein as an accelerator, accelerator device, hardware accelerator, and so on) may refer to a coprocessor that can be configured to perform a specialized set of graphics, media, or compute operations, for example. An accelerator may include, but are not limited to, a specialized CPU, general-purpose CPU, GPU, or programmable logic device (also referred to as a programmable integrated circuit (IC)).

Some implementations may utilize programmable logic devices (e.g., field programmable gate array (FPGA) or application-specific integrated circuit (ASIC)) as one type of hardware accelerator that can be configured to support a data parallel programming model. In some implementations, the programmable logic device can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute). The server is typically managed by some trusted party, such as a cloud service provider (CSP).

In the following description, numerous specific details are set forth to provide a more thorough understanding. However, it may be apparent to one of skill in the art that the embodiments described herein may be practiced without one or more of these specific details. In other instances, well-known features have not been described to avoid obscuring the details of the present embodiments.

While the concepts of the present disclosure are susceptible to various modifications and alternative forms, specific embodiments thereof have been shown by way of example in the drawings and are described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As previously described, the use of hardware accelerators for edge computing has enabled faster workload processing and has emerged as an effective architecture for acceleration of diverse workloads. Workload diversity in applications relies on architectural diversity in the underlying computing platform. A mix of scalar, vector, matrix, and spatial (SVMS) architectures deployed in CPU, GPU, AI, and field programmable gate array (FPGA) accelerators can be used to provide the performance for the diverse workloads.

In an architecturally diverse platform, coding for CPUs and accelerators relies on different languages, libraries, and tools. That means that each hardware platform utilizes separate software investments and provides limited application code reusability across different target architectures. A data parallel programming model, such as the oneAPI® programming model, can simply the programming of CPUs and accelerators using programming code (such as C++) features to express parallelism with a data parallel programming language, such as the DPC++ programming language.

The data parallel programming language can enable code reuse for the host (such as a CPU) and accelerators (such as a GPU or FPGA) using a single source language, with execution and memory dependencies communicated. Mapping within the data parallel programming language code can be used to transition the application to run on the hardware, or set of hardware, that accelerates the workload. A host is available to simplify development and debugging of device code.

In conventional systems, a data parallel programming model may include an integral task graph, which defines how computational kernels are to be executed and when data should be moved based on data and control dependencies. There is scheduling flexibility in many task graphs that in conventional systems is managed through sub-optimal heuristics and policies such as "maximally eager execution" or "maximally lazy execution". As such, modeling for energy-optimal scheduling is not performed because cache energy consumption and/or functional unit execution costs typically depend on the data being processed, making such metrics intractable to model in the runtime scheduler ahead of time.

Task graphs in the data parallel programming model provide more information to the task scheduler than available in lower level interfaces, and provide support for heterogeneous graphs that incorporate multiple different types of accelerator including accelerators from different vendors, which further complicates a priori modelling in the graph scheduler.

To address the above-noted technical drawbacks, implementations of the disclosure provide for data parallel programming task graph optimization through device telemetry, such as device telemetry collected from accelerator hardware devices. Implementations herein improve data parallel programming task graph scheduling, including scheduling of graphs containing a single or multiple different devices, through two techniques. A first technique includes collecting telemetry data from execution instances on a device, such as an accelerator device, as input for future scheduling optimizations of the task graph. Metrics collected through the device telemetry data can include, but are not limited to, power consumption, cache access efficiencies, hardware utilization, raw memory utilization, performance per watt, performance per clock cycle, time duration of execution, interconnect efficiency (in terms of bandwidth and/or latency), and/or occurrence of stalls, for example. This telemetry data is used as part of a task graph scheduling optimization formulation, to increase efficiency of future graph executions in multiple target metrics. Implementations further utilize the collected telemetry data to generate task graph optimizations to include selection of target accelerator device when optimizing across the set of possible graph iso-morphisms/schedules.

A second technique is to dynamically and in-situ evolve the graph scheduler optimization objectives during the program execution based on the collected device telemetry data from portions of the task graph that have already executed and based on history from previous executions.

Implementations provide for technical advantages including improved optimization on aggregate metrics, such as system power or memory access efficiency. Power consumption in computing systems is non-trivial and limits available compute capacity. As such, the telemetry-driven power-centric and memory-centric scheduler optimizations within task graphs as provided by implementations herein can provide technical advantages over conventional approaches, which target correctness and latency minimization. Moreover, performance of data parallel programming applications is improved by increasing optimality in the ordering and timing of kernel and memory transfer invocations as submitted to underlying device queues.

FIG. 1 is a block diagram illustrating a host system 100 for data parallel programming task graph optimization through device telemetry, according to some embodiments. In some embodiments, host system 100 may include a computer platform hosting an integrated circuit ("IC"), such as a system on a chip ("SoC" or "SOC"), integrating various hardware and/or software components of computing device 100 on a single chip.

As illustrated, in one embodiment, host system 100 may include any number and type of hardware and/or software components, such as (without limitation) central processing unit ("CPU" or simply "application processor") 110, graphics processing unit ("GPU" or simply "graphics processor"), graphics driver (also referred to as "GPU driver", "graphics driver logic", "driver logic", user-mode driver (UMD), user-mode driver framework (UMDF), or simply "driver"), hardware accelerators 170a-y (such as programmable logic device 10 described above with respect to FIGS. 1-7 including, but not limited to, an FPGA, ASIC, a re-purposed CPU, or a re-purposed GPU, for example), memory, network devices, drivers, or the like, as well as input/output (I/O) sources, such as touchscreens, touch panels, touch pads, virtual or regular keyboards, virtual or regular mice, ports, connectors, etc. Host system 100 may include a host operating system (OS) 150 serving as an interface between hardware and/or physical resources of the host system 100 and a user.

It is to be appreciated that a lesser or more equipped system than the example described above may be utilized for certain implementations. Therefore, the configuration of host system 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In the context of the examples herein, the host system 100 is shown including a CPU 110 running a virtual machine monitor (VMM) 140 and host OS 150. The host system 100 may represent a server in a public, private, or hybrid cloud or may represent an edge server located at the edge of a given network to facilitate performance of certain processing physically closer to one or more systems or applications that are creating the data being stored on and/or used by the edge server.

In some implementations, although host system 100 is depicted as implementing a virtualization system to virtualize its resources (e.g., memory resources and processing resources), some implementations may execute applications and/or workload on host system 100 by directly utilizing the resources of host system 100, without implementation of a virtualization system.

Depending upon the particular implementation, the VMM 140 may be a bare metal hypervisor (e.g., Kernel-based Virtual Machine (KVM), ACRN, VMware ESXi, Citrix XenServer, or Microsoft Hyper-V hypervisor) or may be a hosted hypervisor. The VMM 140 is responsible for allowing the host system 100 to support multiple VMs (e.g., 120a-n, collectively referred to herein a VMs 120) by virtually sharing its resources (e.g., memory resources and processing resources) for use by the VMs.

Each of the VMs 120 may run a guest operating system (OS) (e.g., Linux or Windows) as well as a driver (e.g., 137a-n) for interfacing with accelerators (e.g., accelerators 170a-x) compatible with one or more input/output (I/O) bus technologies (e.g., Accelerated Graphics Port (AGP), Peripheral Component Interconnect (PCI), PCI eXtended (PCI-X), PCI Express, or the like).

In the context of the example herein, a host operating system (OS) 150 is logically interposed between the VMM 140 and a host interface 160 (e.g., a serial or parallel expansion bus implementing one or more I/O bus technologies) and may be responsible for dynamically routing workloads (e.g., workloads 135a-n) of the VMs 120 to one or more hardware accelerators (e.g., accelerators 170a-y, collectively referred to herein as accelerators 170) coupled to the host system 100 via the host interface 160. The host OS 150 may include a data parallel programming compiler 152 and a data parallel programming runtime 154 to enable data parallel programming task graph optimization through device telemetry. A non-limiting example of various functional units that might make up the data parallel programming compiler 152 and a data parallel programming runtime 154 is described below with reference to FIG. 2.

In some implementations, host system 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable. In some implementations, the accelerators 170 may be communicably coupled to host system 100 via the network interface device(s).

The accelerators 170 may represent one or more types of hardware accelerators (e.g., XPUs) to which various tasks (e.g., workloads 135a-n) may be offloaded from the CPU 100. For example, workloads 135a-n may include large AI and/or ML tasks that may be more efficiently performed by a graphics processing unit (GPU) than the CPU 100. In one embodiment, rather than being manufactured on a single piece of silicon, one or more of the accelerators may be made up of smaller integrated circuit (IC) blocks (e.g., tile(s) 175a and tiles(s) 175m), for example, that represent reusable IP blocks that are specifically designed to work with other similar IC blocks to form larger more complex chips (e.g., accelerators 170a-y). In some implementations, an accelerator 170 may include, but is not limited to, a GPU, a specialized CPU, general-purpose CPU, or a programmable logic device including, but not limited to, an FPGA, ASIC, a re-purposed CPU, or a re-purposed GPU, for example.

In various examples described herein, slices of physical resources (not shown) of individual accelerators (e.g., at the tile level and/or at the accelerator level) may be predefined (e.g., via a configuration file associated with the particular accelerator) and exposed as Virtual Functions (VFs) (e.g., VFs 180a-x, collectively referred to herein as VFs 180). As described further below, data parallel programming task graph optimization through device telemetry may be performed by the data parallel programming runtime 154 based on compiled telemetry data of an executing instance(s) of an application program compiled by a data parallel programming compiler 152, as discussed further below with respect to FIGS. 2-6.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
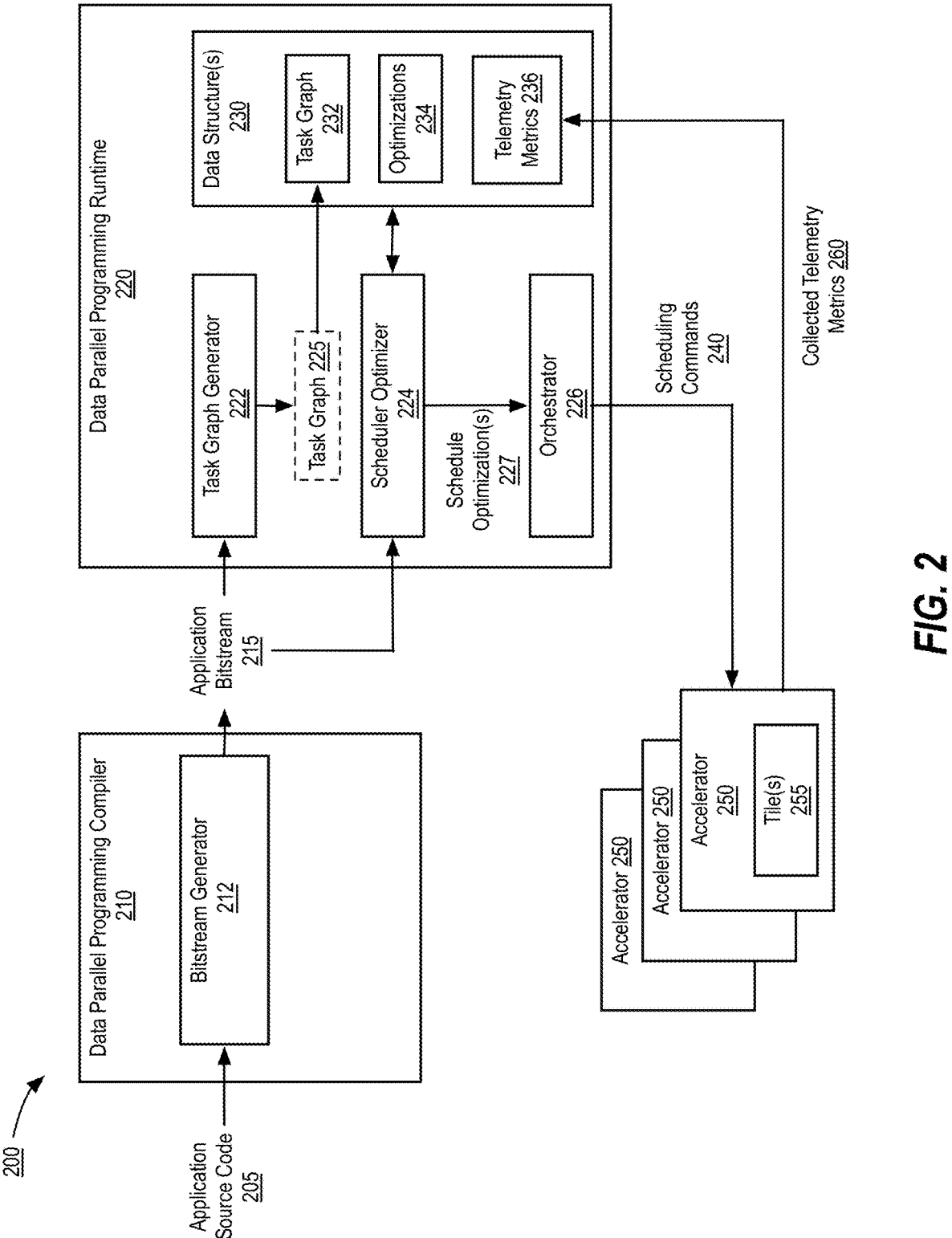
FIG. 2 illustrates a computing environment including a data parallel programming compiler and a data parallel programming runtime to implement data parallel programming task graph optimization through device telemetry, in accordance with implementation herein.

FIG. 2 illustrates a computing environment 200 including a data parallel programming compiler 210 and a data parallel programming runtime 220 to implement data parallel programming task graph optimization through device telemetry, in accordance with implementation herein. In one implementation, data parallel programming compiler 210 is the same as data parallel programming compiler 152 of FIG. 1 and data parallel programming runtime 220 is the same as data parallel programming runtime 154 of FIG. 1. In one implementation, computing environment 200 may be part of host system 100 of FIG. 1. For example, data parallel programming compiler 210 and a data parallel programming runtime 220 may be hosted by CPU 110 described with respect to FIG. 1. Furthermore, data parallel programming compiler 210 and a data parallel programming runtime 220 may be communicably coupled to one or more accelerators 250, which may be the same as accelerator 170 of FIG. 1 in implementations herein. For brevity, many of the details already discussed with reference to FIG. 1 are not repeated or discussed hereafter.

With respect to FIG. 2, in one implementation, the data parallel programming compiler 210 (also referred to herein as compiler 210) may include, but is not limited to, a bitstream generator 212. The data parallel programming runtime 220 (also referred to herein as runtime 220) may include, but is not limited to, a task graph generator 222, a scheduler optimizer 224, an orchestrator 226, and data structure(s) 230. In implementations herein, the compiler 210 and/or the runtime 220, as well as their sub-components, may be implemented by hardware, software, firmware and/or any combination of hardware, software and/or firmware. Accelerator(s) 250 may include one or more tile(s) 255 (which can be the same as tiles 175 of FIG. 1). In one implementation tile(s) 255 may refer to regions of an FPGA accelerator device that can be configured via PR.

As previously described, a data parallel programming model, such as the one depicting in computing environment 200, may include an integral task graph, which defines how computational kernels are to be executed and when data should be moved based on data and control dependencies. Task graphs in the data parallel programming model provide more information to the task scheduler than available in lower level interfaces, and provide support for heterogeneous graphs that incorporate multiple different types of accelerator including accelerators from different vendors, which further complicates a priori modelling in the graph scheduler. There is scheduling flexibility in many task graphs that can be managed through techniques of implementations discussed herein.

In one implementation, the compiler 210 may receive application source code 205 for purposes of compilation. In one implementation the compiler 210 is a JIT compiler. The bitstream generator 212 may receive the application source code 205 and generate one or more application bitstreams 215 to provide to data parallel programming runtime 220. In implementations herein, the application bitstream 215 is compiled for portions of the application source code 205, such as for each kernel of the application source code 205. A kernel may refer to a unit of computation in the data parallel programming model. A kernel may be as small as a single line of code or can encompass many lines of code (e.g., thousands of lines of code, etc.).

The runtime 220 can utilize the task graph generator 222 to create a task graph 225 based on the application bitstream 215 generated by compiler 210. The task graph 225 is a representation of the relationships and dependencies existing in the application source code 205 as represented by the application bitstream 215. As such, the task graph 225 can provide information on how quickly kernels should complete based on downstream data and control dependencies. In one implementation, the task graph 225 may be stored in an internal data structure 230 of the runtime 220 as task graph 232.

Figure 3:
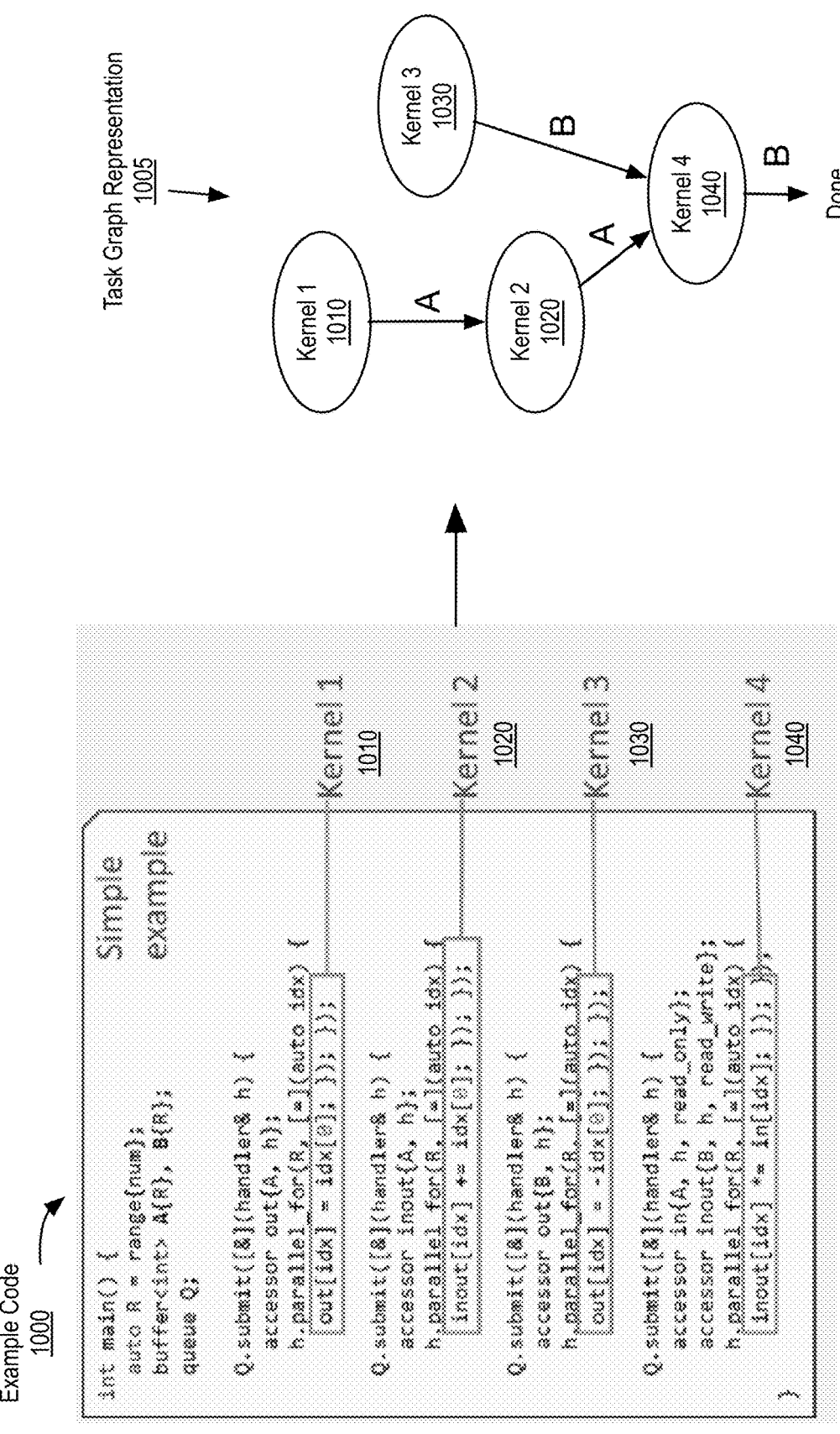
FIG. 3 is an example representation of a task graph originating from example code of a data parallel programming program, in accordance with implementations herein.

FIG. 3 is an example representation of a task graph 305 originating from example code 300 of a data parallel programming program, in accordance with implementations herein. As illustrated, the example code 300 includes kernels 310-340 shown in boxes in the example code 300. A kernel 310-340 may refer to a unit of computation in the data parallel programming model. Although kernels 310-340 are shown in the simplified examples as a single line of code, in some implementations, kernels 310-340 can encompass many lines of code (e.g., thousands of lines of code, etc.). FIG. 3 illustrates a task graph representation 305 corresponding to example code 300, where the task graph representation 305 provides an abstract representation of the relationships and dependencies between the kernels 310-340 of example code 300. The task graph, such as task graph 305, allows for scheduling flexibility of the kernels of application bitstream 215. Example allowable execution orderings of kernels 310-340 on a single device (simple case) are shown in FIG. 4.

Figure 4:
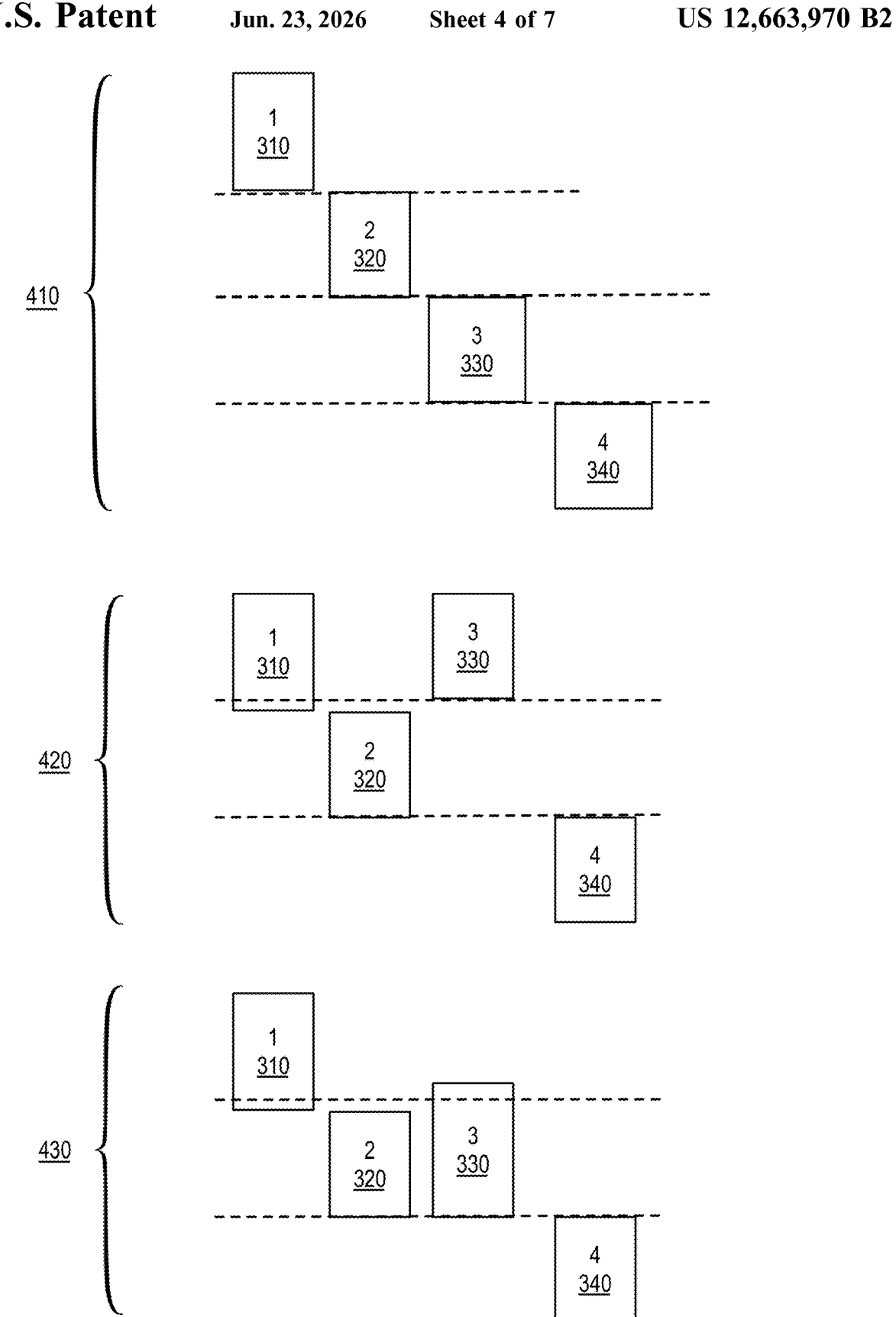
FIG. 4 illustrates a schematic of example execution orderings for kernels of an application based on a task graph of the application, in accordance with implementations herein.

FIG. 4 illustrates a schematic of example execution orderings for kernels of an application based on a task graph of the application, in accordance with implementations herein. In one implementation, kernels 310-340 of FIG. 3 are shown in three example allowable execution orderings 410, 420, 430. The example allowable execution orderings 410, 420, 430 are all execution orderings that are considered legal in view of relationships and dependencies indicated by task graph 305.

In example execution ordering 410, the kernels 310-340 are depicting as executing sequentially, without any overlap of execution. In example execution ordering 420, kernel 1 310 and kernel 3 330 are executed in parallel, followed sequentially by execution of kernel 2 320 and then kernel 4 340. In example execution ordering 430, kernel 1 310 is executed, followed by kernel 3 330 beginning execution prior to the completion of kernel 1 310, with kernel 2 320 executing subsequent. to completion of kernel 1 310 but in parallel with kernel 3 330, and lastly followed by kernel 4 340 after kernel 1 310, kernel 2 320, and kernel 3 330 have completed execution. As noted above, each of the execution orderings 410-430 are considered legal (e.g., allowable) execution orders in view of relationships and dependencies indicated by task graph 305, but each may have different results in terms of energy consumption by the underlying accelerator devices executing the kernels 310-340.

Implementations herein improve data parallel programming task graph scheduling, including scheduling of graphs containing a single or multiple different devices, through collection of device telemetry data. Referring back to FIG. 2, the schedule optimizer 224 may utilize the task graph 225 (stored as task graph 232 in data structure 230) as well as telemetry metrics 236 stored in data structure 230 as input for schedule optimizations 227. Schedule optimizations 227 may include an optimized execution order of kernels of the task graph 232. In one implementation, the schedule optimizations are stored as optimizations 234 in data structure 230. The telemetry metrics 236 may include collected telemetry metrics 260 resulting from execution instances of the kernels of the application on accelerators 250. Collected telemetry metrics 260 can include, but are not limited to, power consumption and cache access efficiencies. In one implementation, the collected telemetry metrics 260 can be stored as telemetry metrics 236 in data structure 230. In one implementation, device telemetry results can be cached (e.g., as telemetry metrics 236) for future executions of the kernels in future program invocations, using the same identification mechanisms as are used to cache binaries for just-in-time (JIT) compiled kernels.

In some implementations, the accelerator(s) 250 can incorporate hardware to track and expose runtime telemetry to vendor tooling. Measurement of device power consumption, memory/cache efficiencies, and other metrics during kernel executions and data transfers can be used to drive power-optimal and memory-optimal scheduling of task graph executions onto hardware.

The telemetry metrics 236 can be used as part of the task graph scheduling optimization formulation performed by scheduler optimizer 224 in implementations herein to increase efficiency of future graph executions in multiple target metrics. In many cases, scheduling freedom with a task graph can enable improved power efficiency without extending overall execution time, thereby improving performance per watt of the system.

In one implementation, the scheduler optimizer 224 provides the schedule optimizations 227 to orchestrator 226. In some implementations, orchestrator 226 may also be referred to as a scheduler. The orchestrator 226 can provide scheduling commands 240 to accelerator(s) 250 to cause the accelerator(s) 250 to implement the schedule optimizations 227. The scheduling commands 240 may include kernel invocation commands and/or data movement commands that can be submitted to hardware interface queues of the accelerator(s) 250.

In some implementations, the collected telemetry metrics 260 as the input for the scheduler optimizer 224 formulation may be obtained in two ways: (1) through initial warmup and measurement invocations of kernels on accelerators 250 that are potentially targeted (through device feature/aspect compatibility); or (2) by obtaining telemetry of in-situ execution of kernels in normal execution flows, and performing statistical or machine learning analysis to extract per-kernel/per-transfer energy estimates, which can incrementally feed into the scheduler optimizer's 224 cost objective function as the program executes. The first data collection approach would typically be used before large scale deployment of applications, while the second can improve results in all uses of the runtime 220 where similar task graphs 232 are executed more than once in an application's lifetime. The second approach of in-situ power correlation is transparent to users, and enables incremental improvements in program energy efficiency as the program executes without addition of any up-front runtime costs. Further details of the first data collection approach are provided with respect to FIG. 5 below. Further details of the second data collection approach are provided with respect to FIG. 6 below.

Implementations further utilize the collected telemetry data to generate task graph optimizations to include selection of target accelerator device when optimizing across the set of possible graph iso-morphisms/schedules. Training of a model of the scheduler optimizer 224 for optimization of the task graph 232 from extracted telemetry metrics 236 could be through utilization of, for example, statistical techniques, machine learning/deep learning, and/or energy-minimizing optimization methods.

As previously noted, dynamically and in-situ evolution of the graph scheduler optimization objectives during the program execution is possible based on the collected device telemetry data from portions of the task graph that have already executed and based on history from previous executions. Telemetry-based graph optimization can be further extended to future meta-queues, where only a class of accelerator (including the maximal class of "any accelerator") is bound to a queue, and where the runtime 220 should choose not only when to execute kernels, but on which accelerator 250 to execute them. The incorporation of power and memory efficiency telemetry from previous executions of kernels can lead to a more intelligent choice of accelerator 250 target.

In some implementations, in a multi-tenant environment of the accelerator(s) 250, the collected telemetry metrics can be used to factor in noisy (e.g., heavy power consuming) tenants in the accelerator 250 to improve graph generation and scheduling optimization of kernels on the accelerator 250.

Figure 5:
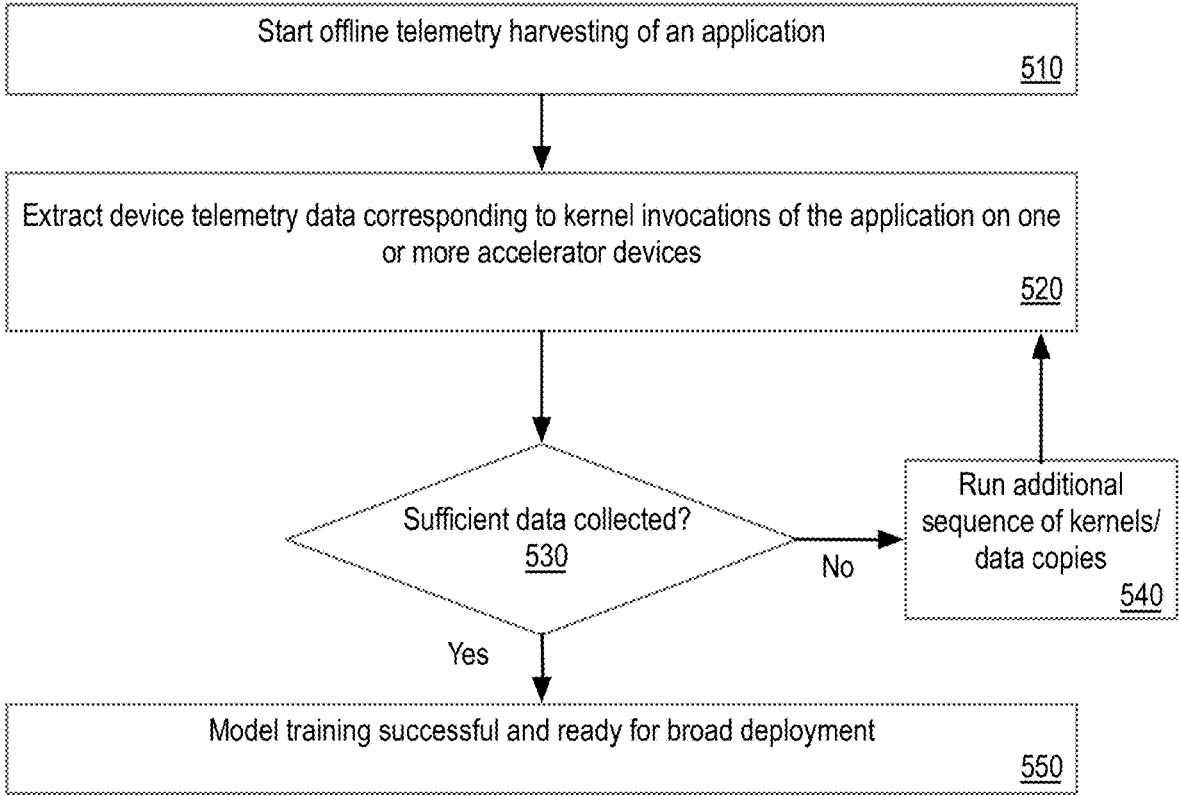
FIG. 5 is a flow diagram illustrating a method for pre-construction of a graph scheduling cost model for data parallel programming task graph optimization using device telemetry, in accordance with implementations of the disclosure.

FIG. 5 is a flow diagram illustrating a method 500 for pre-construction of a graph scheduling cost model for data parallel programming task graph optimization using device telemetry, in accordance with implementations of the disclosure. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, a processor implementing a runtime, such as a processor 110 implementing data paralleling programming runtime 154 or data parallel programming runtime 220 described with respect to FIGS. 1-2, may perform method 500.

Method 500 begins at block 510 where the processor may start an offline telemetry harvesting for an application. In one implementation, the offline telemetry harvesting is a pre-execution of the application prior to a live execution of the application. In one implementation, the offline telemetry harvesting is referred to herein as an offline harvesting session. At block 520, the processing device may extract device telemetry data corresponding to kernel invocations of the application on one or more accelerator devices. In one implementation, the telemetry data may include metrics such as power consumption, cache access efficiencies, hardware utilization, raw memory utilization, performance per watt, performance per clock cycle, time duration of execution, interconnect efficiency, or occurrence of stalls.

At decision block 530, the processing device determines whether sufficient telemetry data has been collected. This determination may be based on a threshold condition of telemetry data being gathered. If it is determined that insufficient telemetry data has been gathered, then method 500 proceeds to block 540 where the processing device may run additional sequence of kernels/data copies and return to block 520. On the other hand, if sufficient telemetry data has been gathered, then method 500 proceeds to block 550 where the processing device may consider the model training successful and indicate readiness for broad deployment.

Figure 6:
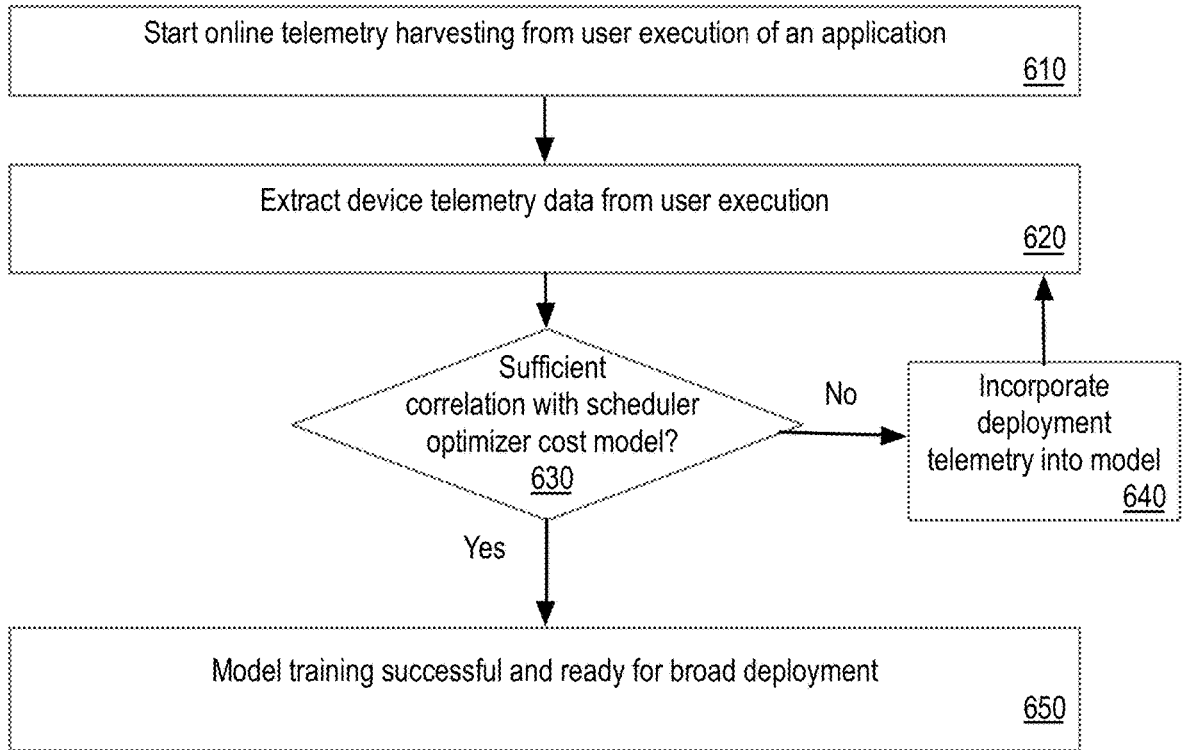
FIG. 6 is a flow diagram illustrating a method for online adaptation of a graph scheduling cost model for data parallel programming task graph optimization using device telemetry, in accordance with implementations of the disclosure.

FIG. 6 is a flow diagram illustrating a method 600 for online adaptation of a graph scheduling cost model for data parallel programming task graph optimization using device telemetry, in accordance with implementations of the disclosure. Method 600 may be performed by processing logic that may comprise hardware (e.g., circuitry, dedicated logic, programmable logic, etc.), software (such as instructions run on a processing device), or a combination thereof. More particularly, the method 600 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-5 may not be repeated or discussed hereafter. In one implementation, a processor implementing a runtime, such as a processor 110 implementing data paralleling programming runtime 154 or data parallel programming runtime 220 described with respect to FIGS. 1-2, may perform method 600.

Method 600 begins at block 610 where the processor may start an online telemetry harvesting from a user execution of an application. In one implementation, the online telemetry harvesting includes a live execution of the application initiated by an end user. In one implementation, the online telemetry harvesting is referred to herein as an online harvesting session. Subsequently, at block 620, the processing device may extract device telemetry data from user execution. In one implementation, the telemetry data may include metrics such as power consumption, cache access efficiencies, hardware utilization, raw memory utilization, performance per watt, performance per clock cycle, time duration of execution, interconnect efficiency, or occurrence of stalls.

At decision block 630, the processing device may determine whether sufficient correlation with a scheduler optimizer cost model exists. If not, the method 600 proceeds to block 640 where the processing device may incorporate deployment telemetry into the scheduler optimizer cost model and returns to block 620. On the other hand, if there is insufficient correlation with the scheduler optimizer cost model, then method 600 proceeds to block 650 where the processor may consider the model training successful and indicate readiness for broad deployment.

In some implementations herein, method 500 and method 600 can be combined. For example, method 600 may initiate following the completion of method 500 so that the online telemetry harvesting of method 600 is also performed along with the offline telemetry harvesting of method 500.

Figure 7:
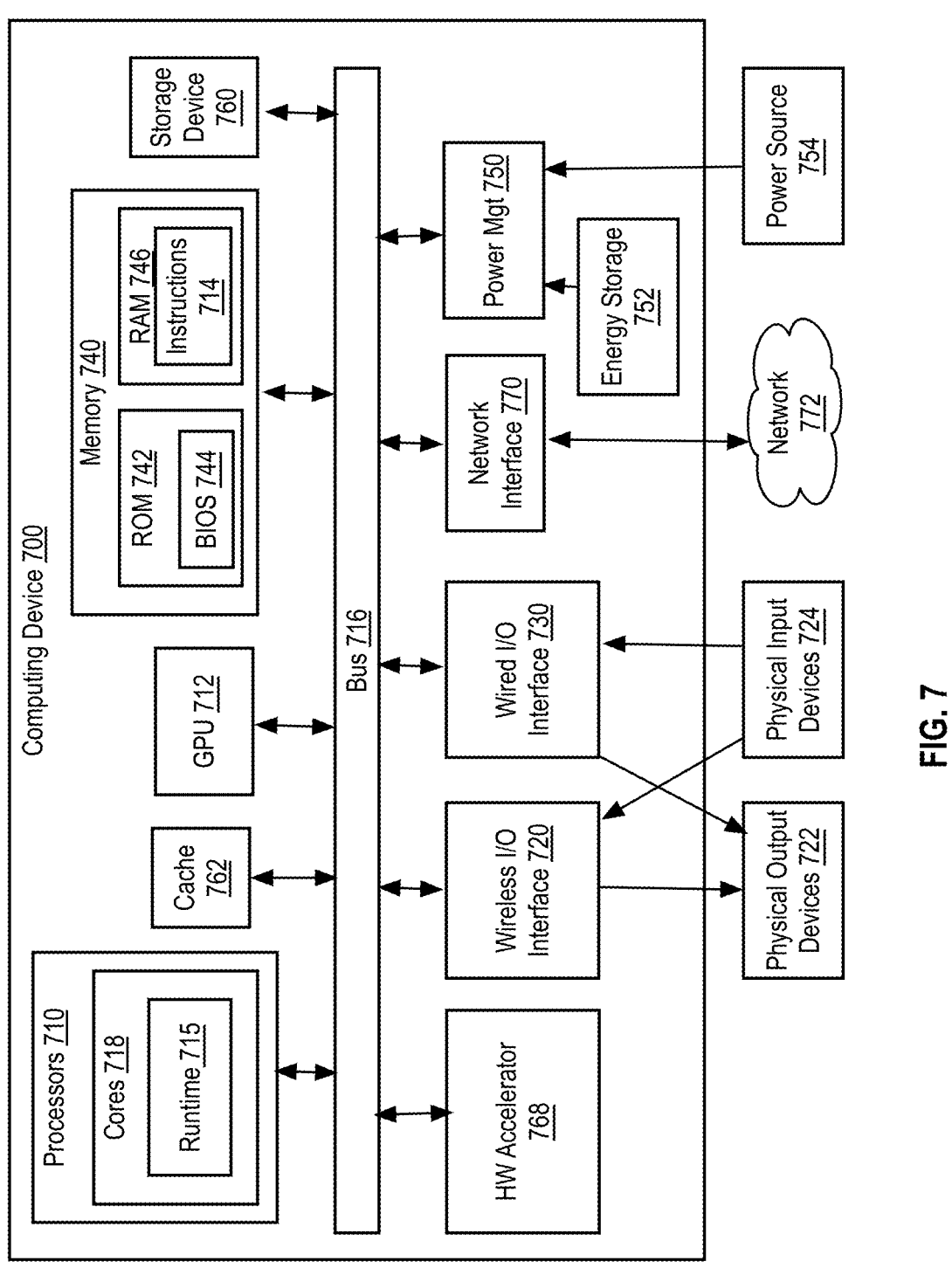
FIG. 7 is a schematic diagram of an illustrative electronic computing device to enable data parallel programming task graph optimization through device telemetry, according to some embodiments.

FIG. 7 is a schematic diagram of an illustrative electronic computing device 700 to enable data parallel programming task graph optimization through device telemetry, according to some embodiments. In some embodiments, the computing device 700 includes one or more processors 710 including one or more processors cores 718 including a runtime 715, such as a data parallel programming runtime 154, 220 described with respect to FIGS. 1 and 2, respectively. In some embodiments, the computing device is to provide data parallel programming task graph optimization through device telemetry, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, system memory 740

(e.g., memory circuitry), power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art can appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks are not described in further detail herein, as they can be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 794 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus

716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Flowcharts representative of example hardware logic, machine readable instructions, hardware implemented state machines, and/or any combination thereof for implementing the systems, already discussed. The machine readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the whole program and/or parts thereof could alternatively be executed by a device other than the processor and/or embodied in firmware or dedicated hardware. Further, although the example program is described with reference to the flowcharts illustrated in the various figures herein, many other methods of implementing the example computing system may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate data parallel programming task graph optimization through device telemetry. The apparatus of Example 1 comprises a processor to: receive, from a compiler, compiled code generated from source code of an application, the compiled code to support a workload of the application; generate a task graph of the application using the compiled code, the task graph to represent at least one of a relationship or dependency of the compiled code; receive runtime telemetry data corresponding to execution of the compiled code on the one or more accelerator devices; identify one or more scheduling optimizations for the one or more accelerator devices based on the task graph and the received telemetry data; and provide a scheduling command to cause the one or more scheduling optimizations to be implemented in the one or more accelerator devices.

In Example 2, the subject matter of Example 1 can optionally include wherein the runtime telemetry data is generated during an offline harvesting session comprising a pre-execution of the application prior to a live execution of the application. In Example 3, the subject matter of any one of Examples 1-2 can optionally include wherein the runtime telemetry data is generated during an online harvesting session comprising a live execution of the application. In Example 4, the subject matter of any one of Examples 1-3 can optionally include wherein the runtime telemetry data is cached for future executions of the application.

In Example 5, the subject matter of any one of Examples 1–4 can optionally include wherein the one or more scheduling optimizations comprise an execution ordering of invocations of kernels of the application and data movements of the application. In Example 6, the subject matter of any one of Examples 1-5 can optionally include wherein the one or more scheduling optimizations comprise selection of one or more accelerator devices to execute the kernels of the application. In Example 7, the subject matter of any one of Examples 1-6 can optionally include wherein the processor is further to train, using the runtime telemetry data, a scheduler optimizer to identify the one or more scheduling optimizations.

In Example 8, the subject matter of any one of Examples 1-7 can optionally include wherein runtime telemetry data comprises at least one of power consumption, cache access efficiencies, hardware utilization, raw memory utilization, performance per watt, performance per clock cycle, time duration of execution, interconnect efficiency, or occurrence of stalls. In Example 9, the subject matter of any one of Examples 1-8 can optionally include wherein the accelerator device comprises at least one a graphic processing unit (GPU), a central processing unit (CPU), or a programmable integrated circuit (IC). In Example 10, the subject matter of any one of Examples 1-9 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 11 is a method for facilitating data parallel programming task graph optimization through device telemetry. The method of Example 11 can include receiving, by a processing device, compiled code generated from source code of an application, the compiled code to support a workload of the application; generating, by the processing device, a task graph of the application using the compiled code, the task graph to represent at least one of a relationship or dependency of the compiled code; receiving runtime telemetry data corresponding to execution of the compiled code on the one or more accelerator devices; identifying, by the processing device, one or more scheduling optimizations for the one or more accelerator devices based on the task graph and the received telemetry data; and providing a scheduling command to cause the one or more scheduling optimizations to be implemented in the one or more accelerator devices.

In Example 12, the subject matter of Example 11 can optionally include wherein the runtime telemetry data is generated during an offline harvesting session comprising a pre-execution of the application prior to a live execution of the application. In Example 13, the subject matter of Examples 11-12 can optionally include wherein the one or more scheduling optimizations comprise an execution ordering of invocations of kernels of the application and data movements of the application.

In Example 14, the subject matter of Examples 11-13 can optionally include further comprising training, using the runtime telemetry data, a scheduler optimizer to identify the one or more scheduling optimizations. In Example 15, the subject matter of Examples 11-14 can optionally include wherein runtime telemetry data comprises at least one of power consumption, cache access efficiencies, hardware utilization, raw memory utilization, performance per watt, performance per clock cycle, time duration of execution, interconnect efficiency, or occurrence of stalls.

Example 16 is a non-transitory computer-readable storage medium for facilitating data parallel programming task graph optimization through device telemetry. The non-transitory computer-readable storage medium of Example 16 having stored thereon executable computer program instructions that, when executed by one or more processors, cause the one or more processors to perform operations comprising: receive, by the at least one processor, compiled code generated from source code of an application, the compiled code to support a workload of the application; generate, by the at least one processor, a task graph of the application using the compiled code, the task graph to represent at least one of a relationship or dependency of the compiled code; receive runtime telemetry data corresponding to execution of the compiled code on the one or more accelerator devices; identify, by the at least one processor, one or more scheduling optimizations for the one or more accelerator devices based on the task graph and the received telemetry data; and provide a scheduling command to cause the one or more scheduling optimizations to be implemented in the one or more accelerator devices.

In Example 17, the subject matter of Example 16 can optionally include wherein the runtime telemetry data is generated during an offline harvesting session comprising a pre-execution of the application prior to a live execution of the application. In Example 18, the subject matter of Examples 16-17 can optionally include wherein the one or more scheduling optimizations comprise an execution ordering of invocations of kernels of the application and data movements of the application.

In Example 19, the subject matter of Examples 16-18 can optionally include wherein the processor is further to train, using the runtime telemetry data, a scheduler optimizer to identify the one or more scheduling optimizations. In Example 20, the subject matter of Examples 16-19 can optionally include wherein runtime telemetry data comprises at least one of power consumption, cache access efficiencies, hardware utilization, raw memory utilization, performance per watt, performance per clock cycle, time duration of execution, interconnect efficiency, or occurrence of stalls.

Example 21 is a system for facilitating data parallel programming task graph optimization through device telemetry. The system of Example 21 can optionally include a memory to store a block of data, and a processor communicably coupled to the memory to: receive, from a compiler, compiled code generated from source code of an application, the compiled code to support a workload of the application; generate a task graph of the application using the compiled code, the task graph to represent at least one of a relationship or dependency of the compiled code; receive runtime telemetry data corresponding to execution of the compiled code on the one or more accelerator devices; identify one or more scheduling optimizations for the one or more accelerator devices based on the task graph and the received telemetry data; and provide a scheduling command to cause the one or more scheduling optimizations to be implemented in the one or more accelerator devices.

In Example 22, the subject matter of Example 21 can optionally include wherein the runtime telemetry data is generated during an offline harvesting session comprising a pre-execution of the application prior to a live execution of the application. In Example 23, the subject matter of any one of Examples 21-22 can optionally include wherein the runtime telemetry data is generated during an online harvesting session comprising a live execution of the application. In Example 24, the subject matter of any one of Examples 21-23 can optionally include wherein the runtime telemetry data is cached for future executions of the application.

In Example 25, the subject matter of any one of Examples 21-24 can optionally include wherein the one or more scheduling optimizations comprise an execution ordering of invocations of kernels of the application and data movements of the application. In Example 26, the subject matter of any one of Examples 21-25 can optionally include wherein the one or more scheduling optimizations comprise selection of one or more accelerator devices to execute the kernels of the application. In Example 27, the subject matter of any one of Examples 21-26 can optionally include wherein the processor is further to train, using the runtime telemetry data, a scheduler optimizer to identify the one or more scheduling optimizations.

In Example 28, the subject matter of any one of Examples 21-27 can optionally include wherein runtime telemetry data comprises at least one of power consumption, cache access efficiencies, hardware utilization, raw memory utilization, performance per watt, performance per clock cycle, time duration of execution, interconnect efficiency, or occurrence of stalls. In Example 29, the subject matter of any one of Examples 21-28 can optionally include wherein the accelerator device comprises at least one a graphic processing unit (GPU), a central processing unit (CPU), or a programmable integrated circuit (IC). In Example 30, the subject matter of any one of Examples 21-29 can optionally include wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic devices (CPLD).

Example 31 is an apparatus for facilitating data parallel programming task graph optimization through device telemetry, comprising means for receiving compiled code generated from source code of an application, the compiled code to support a workload of the application; means for generating a task graph of the application using the compiled code, the task graph to represent at least one of a relationship or dependency of the compiled code; means for receiving runtime telemetry data corresponding to execution of the compiled code on the one or more accelerator devices; means for identifying one or more scheduling optimizations for the one or more accelerator devices based on the task graph and the received telemetry data; and means for providing a scheduling command to cause the one or more scheduling optimizations to be implemented in the one or more accelerator devices. In Example 32, the subject matter of Example 31 can optionally include the apparatus further configured to perform the method of any one of the Examples 12 to 15.

Example 33 is at least one machine readable medium comprising a plurality of instructions that in response to being executed on a computing device, cause the computing device to carry out a method according to any one of Examples 11-15. Example 34 is an apparatus for facilitating data parallel programming task graph optimization through device telemetry, configured to perform the method of any one of Examples 11-15. Example 35 is an apparatus for facilitating data parallel programming task graph optimization through device telemetry, comprising means for performing the method of any one of Examples 11 to 15. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
a processor to:
    receive, from a compiler, compiled code generated from source code of an application, wherein the compiled code is to support a workload of the application;
    generate a task graph of the application using the compiled code, wherein the task graph of the application is to represent at least one of a relationship or a dependency of the compiled code;
    issue first scheduling commands to cause first scheduling operations to be executed on one or more hardware accelerator devices, wherein the first scheduling operations are to cause the one or more hardware accelerator devices to execute the compiled code, and wherein the one or more hardware accelerator devices are to produce runtime telemetry data resulting from the execution of the compiled code on the one or more hardware accelerator devices;
    receive the runtime telemetry data corresponding to the execution of the compiled code on the one or more hardware accelerator devices;
    train, using the received runtime telemetry data, a scheduler optimizer to identify updates to the first scheduling operations based on the task graph of the application and the received runtime telemetry data, wherein the updates to the first scheduling operations are to reduce latency and power consumption corresponding to the one or more hardware accelerator devices and the application;

generate, using the scheduler optimizer, revised scheduling operations based on the updates to the first scheduling operations, wherein the revised scheduling operations comprise an execution ordering of invocations of kernels of the application and data movements of the application;
    issue revised scheduling commands to cause the revised scheduling operations to be executed on the one or more hardware accelerator devices; and
    execute the revised scheduling commands on the one or more hardware accelerator devices to optimize the execution of the compiled code.

2. The apparatus of claim 1, wherein the received runtime telemetry data is generated during an offline harvesting session comprising a pre-execution of the application prior to a live execution of the application.

3. The apparatus of claim 1, wherein the received runtime telemetry data is generated during an online harvesting session comprising a live execution of the application.

4. The apparatus of claim 1, wherein the received runtime telemetry data is cached for future executions of the application.

5. The apparatus of claim 1, wherein the revised scheduling operations comprise a selection of the one or more hardware accelerator devices to execute the kernels of the application.

6. The apparatus of claim 1, wherein the scheduler optimizer is trained to identify the updates to the first scheduling operations through utilization of one or more of statistical techniques, machine learning/deep learning, or energy-minimizing optimization techniques.

7. The apparatus of claim 1, wherein the received runtime telemetry data comprises at least one of power consumption, cache access efficiencies, hardware utilization, raw memory utilization, performance per watt, performance per clock cycle, time duration of execution, interconnect efficiency, or occurrence of stalls.

8. The apparatus of claim 1, wherein the one or more hardware accelerator devices comprise at least one of a graphic processing unit (GPU), a central processing unit (CPU), or a programmable integrated circuit (IC).

9. The apparatus of claim 8, wherein the programmable IC comprises at least one of a field programmable gate array (FPGA), a programmable array logic (PAL), a programmable logic array (PLA), a field programmable logic array (FPLA), an electrically programmable logic device (EPLD), an electrically erasable programmable logic device (EEPLD), a logic cell array (LCA), or a complex programmable logic device (CPLD).

10. A method comprising:
receiving, by a processing device and from a compiler, compiled code generated from source code of an application, wherein the compiled code is to support a workload of the application;
generating, by the processing device, a task graph of the application using the compiled code, wherein the task graph of the application is to represent at least one of a relationship or a dependency of the compiled code;
issuing, by the processing device, first scheduling commands to cause first scheduling operations to be executed on one or more hardware accelerator devices, wherein the first scheduling operations are to cause the one or more hardware accelerator devices to execute the compiled code, and wherein the one or more hardware accelerator devices are to produce runtime telemetry data resulting from the execution of the compiled code on the one or more hardware accelerator devices;

receiving, by the processing device, the runtime telemetry data corresponding to the execution of the compiled code on the one or more hardware accelerator devices;

training, by the processing device and using the received runtime telemetry data, a scheduler optimizer to identify updates to the first scheduling operations based on the task graph of the application and the received runtime telemetry data, wherein the updates to the first scheduling operations are to reduce latency and power consumption corresponding to the one or more hardware accelerator devices and the application;

generating, by the processing device and using the scheduler optimizer, revised scheduling operations based on the updates to the first scheduling operations, wherein the revised scheduling operations comprise an execution ordering of invocations of kernels of the application and data movements of the application;

issuing, by the processing device, revised scheduling commands to cause the revised scheduling operations to be executed on the one or more hardware accelerator devices; and executing, by the processing device, the revised scheduling commands on the one or more hardware accelerator devices to optimize the execution of the compiled code.

11. The method of claim 10, wherein the received runtime telemetry data is generated during an offline harvesting session comprising a pre-execution of the application prior to a live execution of the application.

12. The method of claim 10, wherein the revised scheduling operations comprise a selection of the one or more hardware accelerator devices to execute the kernels of the application.

13. The method of claim 10, further comprising training the scheduler optimizer to identify the updates to the first scheduling operations through utilization of one or more of statistical techniques, machine learning/deep learning, or energy-minimizing optimization techniques.

14. The method of claim 10, wherein the received runtime telemetry data comprises at least one of power consumption, cache access efficiencies, hardware utilization, raw memory utilization, performance per watt, performance per clock cycle, time duration of execution, interconnect efficiency, or occurrence of stalls.

15. A non-transitory machine-readable storage medium storing instructions that, when executed by at least one processor, cause the at least one processor to at least:

receive, by the at least one processor and from a compiler, compiled code generated from source code of an application, wherein the compiled code is to support a workload of the application;

generate, by the at least one processor, a task graph of the application using the compiled code, wherein the task graph of the application is to represent at least one of a relationship or a dependency of the compiled code;

issue, by the at least one processor, first scheduling commands to cause first scheduling operations to be executed on one or more hardware accelerator devices, wherein the first scheduling operations are to cause the one or more hardware accelerator devices to execute the compiled code, and wherein the one or more hardware accelerator devices are to produce runtime telemetry data resulting from the execution of the compiled code on the one or more hardware accelerator devices;

receive, by the at least one processor, the runtime telemetry data corresponding to the execution of the compiled code on the one or more hardware accelerator devices;

train, by the at least one processor and using the received runtime telemetry data, a scheduler optimizer to identify updates to the first scheduling operations based on the task graph of the application and the received runtime telemetry data, wherein the updates to the first scheduling operations are to reduce latency and power consumption corresponding to the one or more hardware accelerator devices and the application;

generate, by the at least one processor and using the scheduler optimizer, revised scheduling operations based on the updates to the first scheduling operations, wherein the revised scheduling operations comprise an execution ordering of invocations of kernels of the application and data movements of the application;

issue, by the at least one processor, revised scheduling commands to cause the revised scheduling operations to be executed on the one or more hardware accelerator devices; and execute, by the at least one processor, the revised scheduling commands on the one or more hardware accelerator devices to optimize the execution of the compiled code.

16. The non-transitory machine-readable storage medium of claim 15, wherein the received runtime telemetry data is generated during an offline harvesting session comprising a pre-execution of the application prior to a live execution of the application.

17. The non-transitory machine-readable storage medium of claim 15, wherein the revised scheduling operations comprise a selection of the one or more hardware accelerator devices to execute the kernels of the application.

18. The non-transitory machine-readable storage medium of claim 15, wherein the scheduler optimizer is trained to identify the updates to the first scheduling operations through utilization of one or more of statistical techniques, machine learning/deep learning, or energy-minimizing optimization techniques.

19. The non-transitory machine-readable storage medium of claim 15, wherein the received runtime telemetry data comprises at least one of power consumption, cache access efficiencies, hardware utilization, raw memory utilization, performance per watt, performance per clock cycle, time duration of execution, interconnect efficiency, or occurrence of stalls.

* * * * *